United States Patent
Leloup et al.

(10) Patent No.: US 11,306,814 B2
(45) Date of Patent: Apr. 19, 2022

(54) DIFFERENTIAL REDUCER INCLUDING MEANS FOR COLLECTING OIL IN THE TWO DIRECTIONS OF ROTATION

(71) Applicant: NISSAN MOTOR CO., LTD., Yokohama (JP)

(72) Inventors: Wilfrield Leloup, Etrechy (FR); Virginie Chabert, St Arnoult en Yvelines (FR); Frederic Maudet, Yerres (FR)

(73) Assignee: NISSAN MOTOR CO., LTD., Yokohama (JP)

(*) Notice: Subject to any disclaimer, the term of this patent is extended or adjusted under 35 U.S.C. 154(b) by 0 days.

(21) Appl. No.: 17/281,690

(22) PCT Filed: Sep. 20, 2019

(86) PCT No.: PCT/EP2019/075404
§ 371 (c)(1),
(2) Date: Mar. 31, 2021

(87) PCT Pub. No.: WO2020/069887
PCT Pub. Date: Apr. 9, 2020

(65) Prior Publication Data
US 2022/0025968 A1    Jan. 27, 2022

(30) Foreign Application Priority Data
Oct. 2, 2018 (FR) ...................... 1859111

(51) Int. Cl.
| F16H 57/04 | (2010.01) |
| F16H 48/38 | (2012.01) |
| F16H 48/42 | (2012.01) |

(52) U.S. Cl.
CPC ......... *F16H 57/0483* (2013.01); *F16H 48/38* (2013.01); *F16H 57/0423* (2013.01); *F16H 57/0457* (2013.01); *F16H 57/0471* (2013.01); *F16H 2048/423* (2013.01)

(58) Field of Classification Search
None
See application file for complete search history.

(56) References Cited

U.S. PATENT DOCUMENTS

| 2,037,074 A * | 4/1936 | Griswold ............ F16H 57/0483 384/469 |
| 4,824,264 A * | 4/1989 | Hoebel ................ F16C 19/386 384/473 |
| 11,186,168 B1 * | 11/2021 | Kim ........................ B60K 1/00 |
| 2014/0187374 A1 * | 7/2014 | Murakami .......... F16C 33/6666 475/160 |
| 2017/0130818 A1 * | 5/2017 | Matsubara ............ F16H 57/045 |

* cited by examiner

Primary Examiner — Colby M Hansen
(74) Attorney, Agent, or Firm — Foley & Lardner LLP

(57) ABSTRACT

A differential reducer for a motor vehicle, including: a differential mechanism including a ring gear; a reduction mechanism including a secondary pinion and a primary pinion; a crankcase including a first half-crankcase and a second half-crankcase, of which an internal transverse wall of each half includes three bearing seats, each internal transverse wall having first means for collecting and directing oil sprayed by the ring gear, which means turn in a first direction of rotation to the bearing seats; wherein each internal wall includes second means for collecting oil which is sprayed substantially transversally through rotation of the ring gear in a second direction of rotation.

12 Claims, 3 Drawing Sheets

DIFFERENTIAL REDUCER INCLUDING MEANS FOR COLLECTING OIL IN THE TWO DIRECTIONS OF ROTATION

TECHNICAL FIELD OF THE INVENTION

The invention relates to a motor vehicle differential reducer including:
- a substantially longitudinal differential mechanism including at least one ring gear of which a lower portion is intended to be immersed in lubricating oil;
- a reduction mechanism including a secondary shaft and a primary shaft, a pinion of the primary shaft being driven by the ring gear via a pinion of the secondary shaft;
- a case which contains the differential mechanism and the reduction mechanism, the differential mechanism and the shafts each being borne in the case by an associated pair of opposite bearings, the case including, on the one hand, a first half-case of which an internal transverse wall includes three housings which each receive a first bearing of each pair, and, on the other hand, a second half-case of which an internal transverse wall includes three housings which each receive a second bearing of each pair, the rotation of the ring gear in a first direction of rotation being capable of spraying oil substantially transversely from the top of the ring gear in the direction of the reducer shafts, each internal transverse wall having first means for collecting and guiding the oil sprayed by the ring gear rotating in the first direction of rotation to the bearing housings.

TECHNICAL BACKGROUND OF THE INVENTION

Numerous examples of differential reducers of this type are known. In the remainder of the description and in the claims, a differential reducer is defined as an assembly including a case which contains a speed reducer and a differential mechanism, a ring gear of the differential mechanism meshing with a primary shaft pinion of the speed reducer.

Conventionally, once the differential reducer mechanism is mounted in the two half-cases and the two half-cases are joined to form a case, the case is filled with a lubricating oil that makes it possible to lubricate the cage of pinions and the rolling bearings by splash lubrication.

To this end, the level of the oil in the case is set substantially at the level of the axis of the differential reducer mechanism or axis of rotation of the ring gear, according to the rule which stipulates that the lubricant level is set at the level of the lowest rolling element.

As long as the differential rotates at a speed below a predetermined speed, the cage of pinions is lubricated by splash lubrication, the cage of pinions being immersed in the lubricating oil. For this purpose, the cage is an open cage which allows the oil to bathe the pinions.

However, such a design has a disadvantage as soon as the differential rotates at high speeds.

Specifically, above a predetermined speed, the lubricating oil is centrifuged by the ring gear and is sprayed against the walls of the case and in particular the walls of the half-cases, from where it flows slowly by trickling, returning only slowly toward the bottom of the housing. As a result, the level of oil present in the housing receiving the cage of pinions becomes insufficient and incapable of ensuring the splash lubrication of the cage of pinions.

This lack of lubrication, even if the oil level appears satisfactory when stationary, may lead sooner or later to the destruction of the rotating elements of the differential due to shortage of oil.

It is therefore known practice to produce ducts for collecting and guiding the oil sprayed in the direction of the rolling bearings and the pinion cage. These collection ducts are oriented substantially tangentially to the bearing housings so as to collect the lubricating oil sprayed by the ring gear when it rotates in a first direction.

However, the ducts for collecting and guiding oil are not designed to collect oil sprayed by the ring gear rotating in a second direction of rotation, opposite to the first direction of rotation. It may be necessary, however, from one vehicle model to the other, for the ring gear to be made to rotate in one direction or in the other, for example according to the available space for the differential reducer.

To ensure good lubrication of the rotating elements, it was necessary to provide different cases according to the direction of rotation of the ring gear.

However, it would be advantageous to find a solution that allows the manufacturing costs of the vehicles to be reduced independently of the direction of rotation of the differential ring gear.

BRIEF SUMMARY OF THE INVENTION

The invention proposes a motor vehicle differential reducer including:
- a substantially longitudinal differential mechanism including at least one ring gear of which a lower portion is intended to be immersed in lubricating oil;
- a reduction mechanism including a secondary shaft and a primary shaft, a pinion of the primary shaft being driven by the ring gear via a pinion of the secondary shaft;
- a case which contains the differential mechanism and the reduction mechanism, the differential mechanism and the shafts each being borne in the case by an associated pair of opposite bearings, the case including, on the one hand, a first half-case of which an internal transverse wall includes three housings which each receive a first bearing of each pair, and, on the other hand, a second half-case of which an internal transverse wall includes three housings which each receive a second bearing of each pair, the rotation of the ring gear in a first direction of rotation being capable of spraying oil substantially transversely from the top of the ring gear in the direction of the reducer shafts, each internal transverse wall having first means for collecting and guiding the oil sprayed by the ring gear rotating in the first direction of rotation to the bearing housings;

characterized in that each internal wall includes second means for collecting the oil sprayed substantially transversely by rotation of the ring gear in a second direction of rotation from the bottom of the ring gear in the direction of the reducer shafts.

According to other features of the invention:
- the second collection means include a lower ramp for guiding the oil that is formed in the internal transverse wall of at least one of the half-cases in order to guide the lubricating oil sprayed from the bottom of the ring gear to the pinion of the primary shaft;
- the pinion of the secondary shaft is arranged at a distance from the oil flow flowing on the lower ramp;
- the secondary shaft is offset vertically above the level of the primary shaft;

the ramp is produced by a rib which extends longitudinally while projecting from the internal transverse wall;

the housing of the bearing of the primary shaft includes in its axial face at least one opening for collecting and guiding the oil lifted by the pinion of the primary shaft from the lower ramp when the ring gear rotates in the second direction of rotation;

the perimeter of the housing of the bearing of the secondary shaft includes at least one duct for collecting and guiding the oil lifted by the pinion of the primary shaft from the lower ramp when the ring gear rotates in the second direction of rotation, the duct guiding the oil to the housing;

the perimeter of the housing of the bearing of the secondary shaft includes at least one face for collecting and guiding the oil sprayed by the pinion of the primary shaft when the ring gear rotates in the second direction of rotation, the face guiding the oil to the housing;

the perimeter of the housing of the first bearing of the differential mechanism includes at least one face for collecting and guiding the oil sprayed by the ring gear when it rotates in the second direction of rotation;

at least one of the guide ducts or one of the guide faces is formed by at least one rib which extends longitudinally while projecting from the internal transverse wall;

the first oil collection means are produced directly in the internal wall of the half-cases.

BRIEF DESCRIPTION OF THE FIGURES

Other features and advantages of the invention will become apparent from reading the detailed description which will follow, an understanding of which will be provided by referring to the appended drawings, in which.

DETAILED DESCRIPTION OF THE FIGURES

In the description which will follow, identical numbers or references denote parts which are identical or have similar functions.

By "longitudinal direction" will be understood the direction corresponding to the axis of the differential mechanism.

By "vertical direction" will be understood the direction of gravity, orthogonal to the level of lubricating oil.

By "transverse direction" will be understood any direction perpendicular to the longitudinal and vertical directions.

By "radial direction" will be understood any direction perpendicular to a longitudinal axis of a shaft.

By "tangential direction" will be understood any direction perpendicular to the radial and longitudinal directions.

By "inner" will be designated an element close to the axis of rotation of the differential mechanism.

By "outer" will be designated an element remote from the axis of rotation of the differential mechanism.

Figure 1:
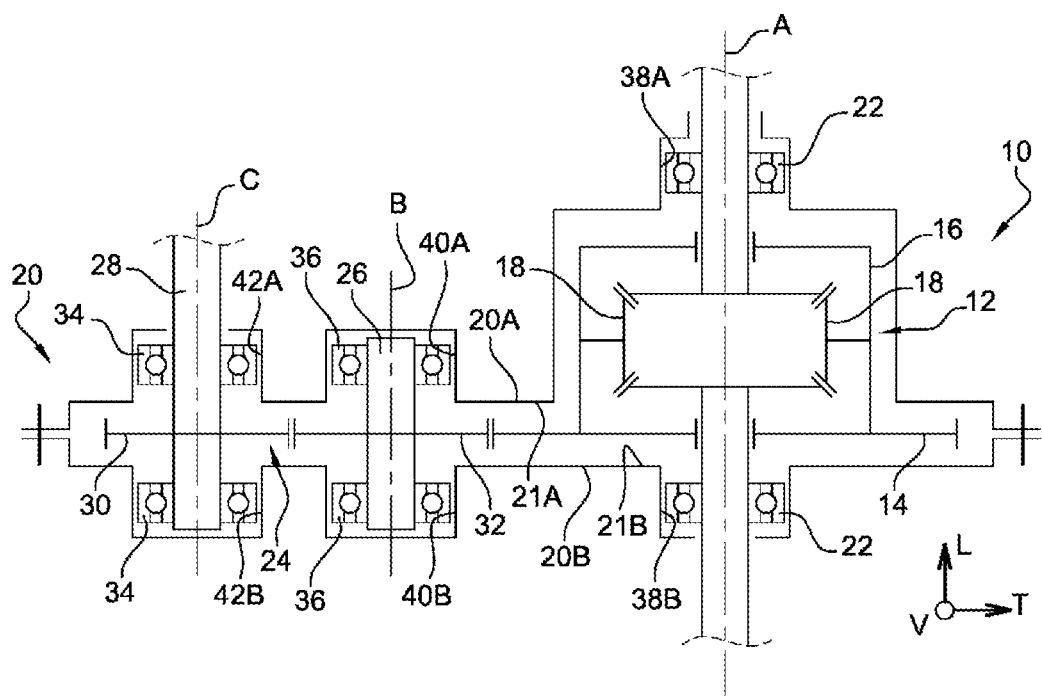
FIG. 1 is a cutaway sectional view along the section line 1-1 of FIG. 2 which schematically represents a differential reducer produced according to the teachings of the invention.

FIG. 1 schematically represents a differential reducer 10 for a motor vehicle. This is for example a rear transmission axle.

The differential reducer includes a substantially longitudinal differential mechanism 12 including at least one ring gear 14 which extends in a vertical transverse plane. The ring gear 14 adjoins a cage 16 receiving planet pinions 18. The cage 16 of pinions is open and for this purpose includes apertures (not shown) allowing lubricating oil to penetrate therein.

In a known manner, the differential mechanism is enclosed in a case 20 formed by two half-cases including a first half-case 20A and a second half-case 20B. The differential mechanism 12 is carried in rotation about a longitudinal axis "A" between the two half-cases 20A, 20B by means of two opposite bearings 22, termed differential bearings 22.

The case 20 also contains a reduction mechanism 24 including a secondary shaft 26 of longitudinal axis "B" and a primary shaft 28 of longitudinal axis "C". The primary shaft 28 includes a pinion 30, termed primary pinion 30, which extends in a transverse vertical plane and which meshes with a transverse vertical pinion 32 of the secondary shaft 26, termed secondary pinion 32. The secondary pinion 32 for its part meshes with the ring gear 14. Thus, the primary pinion 30 is driven to rotate by the ring gear 14 via the secondary pinion 32.

As can be seen from FIG. 1, the secondary reducer shaft 26 is offset in a transverse offsetting direction, here toward the left, with respect to the differential mechanism 12, and the primary shaft 28 is for its part also offset in the transverse offsetting direction with respect to the secondary shaft 26.

The primary shaft 28 is borne in the case 20 by an associate pair of opposite bearings 34, termed primary bearings 34. Likewise, the second shaft 26 is borne in the case 20 by an associated pair of opposite bearings 36, termed secondary bearings 36. The bearings 22, 34, 36 are here rolling bearings formed for example by ball bearings.

The first half-case 20A includes an inner transverse wall 21A which includes three housings 38A, 40A, 42A which respectively receive a first bearing 22 of the pair of differential bearings 22, a first bearing 36 of the pair of secondary bearings 36 and a first bearing 34 of the pair of primary bearings 34.

The second half-case 20B includes an internal transverse wall 21B which includes three housings 38B, 40B, 42B which respectively receive a second bearing 22 of the pair of differential bearings 22, a second bearing 36 of the pair of secondary bearings 36 and a second bearing 34 of the pair of primary bearings 34.

Figure 2:
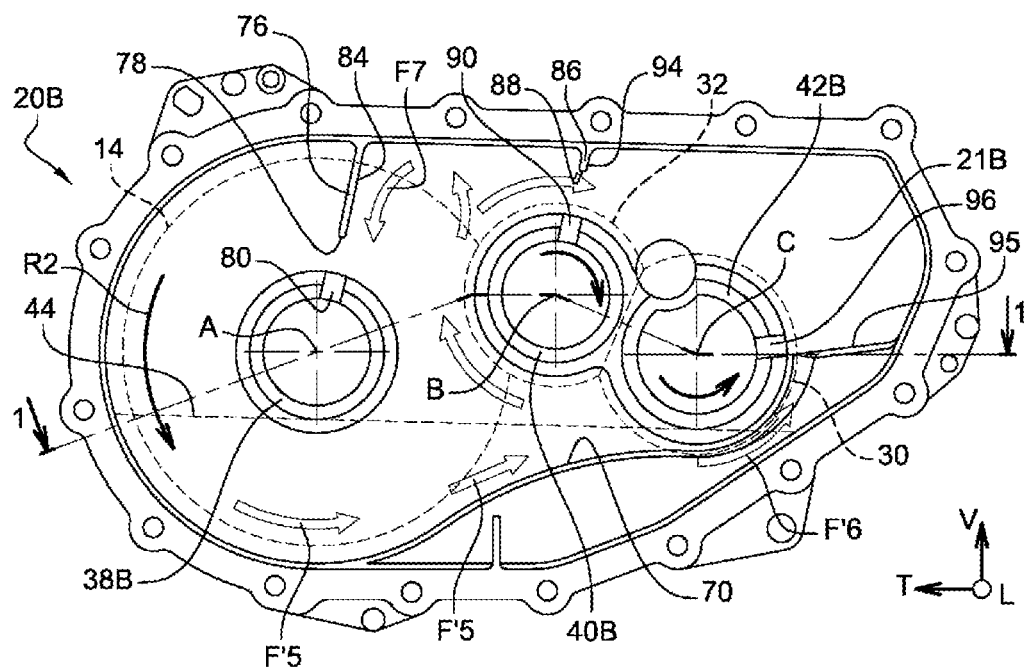
FIG. 2 is a front view which represents the internal wall of a first half-case of the differential reducer of FIG. 1 produced according to the teachings of the invention, indicating the path of the lubricating oil when the ring gear rotates in a second direction of rotation.

The differential mechanism 12 and the reducer 24 are conventionally lubricated by oil which fills the case 20 to a level denoted by the line 44, marked by way of interrupted lines, in FIG. 2. The level 44 corresponds substantially is situated generally in the vicinity of the axis "A" of rotation of the differential mechanism 12 so as to lubricate it by splash lubrication.

Thus, a lower portion of the ring gear 14 is intended to be immersed in the lubricating oil. During the rotation of the ring gear 14 in a first direction of rotation, the clockwise direction with reference to FIG. 2, the teeth of the ring gear 14 splash oil substantially transversely from the top of the ring gear in the direction of the reducer shafts 26, 28.

During the rotation of the differential mechanism 12 at high speeds, and therefore during the rotation of the ring gear 14 at high speeds, it may occur that the differential mechanism 12, and more particularly the ring gear 14, centrifuges the oil until it trickles on the internal walls of the case 20, and more particularly on the internal transverse walls 21A, 21B of the half-cases 20A, 20B.

This results in a deficit of splash lubrication oil at the housing and more particularly at the cage 16 of planet pinions 18, which can lead to a deterioration of the pinions 18 and of the bearings 22, 34, 36. Thus, during the operation of the differential mechanism 12 at high speeds, the oil level is capable of falling below the axis "A". To ensure continuous supply of oil to the bearings 22, 34, 36 in order to avoid deterioration thereof, each internal transverse wall 21A, 21B has first means for collecting and guiding the oil sprayed by the ring gear 14 rotating in the first direction of rotation to the housings 38A, 38B, 40A, 40B, 42A, 42B of the bearings 22, 34, 36.

These first guiding and collecting means are here produced integrally with the half-cases 20A, 20B. They are for example ribs arranged in a projecting manner with respect to the internal walls 21A, 21B and/or ducts recessed into the internal walls 21A, 21B.

The cases of the prior art make it possible to collect and guide the lubricating oil only in one direction of rotation of the ring gear. Now, it would be financially advantageous to be able to use one and the same case for a plurality of vehicle configurations. Thus, one and the same case model can be used for a plurality of models of vehicles. Now, according to the configurations, the ring gear can rotate in one or other of the directions of rotations. However, when the ring gear rotates in an opposite direction, the first collecting and guiding means no longer make it possible to correctly lubricate the bearings. Up until now, it was therefore necessary to provide two different cases according to the direction of rotation of the ring gear.

The invention proposes a versatile case making it possible for the lubricating oil trickling on the internal walls to be collected and guided toward the bearings whatever the direction of rotation of the ring gear 14.

To this end, the internal walls 21A, 21B of the half-cases 20A, 20B include second means for collecting the oil sprayed substantially transversely by rotation of the ring gear 14 in a second direction of rotation from the bottom of the ring gear in the direction of the reducer shafts.

Figure 3:
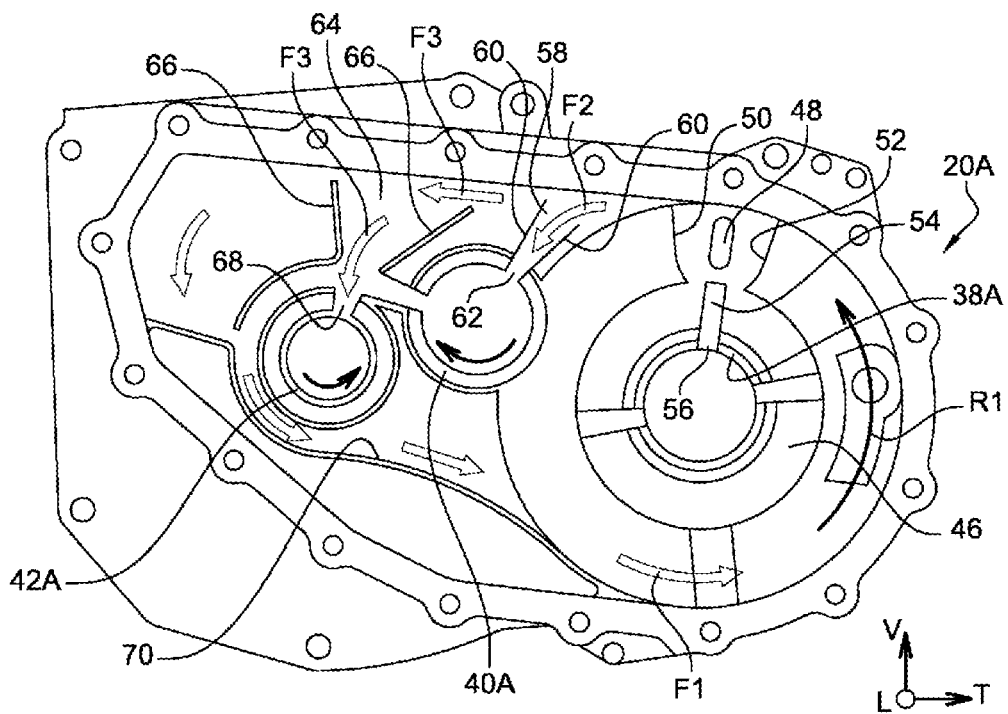
FIG. 3 is a view similar to that of FIG. 2 which represents a second half-case and the internal wall of a first half-case of the differential reducer of FIG. 1 produced according to the teachings of the invention, indicating the path of the lubricating oil when the ring gear rotates in a first direction of rotation.
Figure 4:
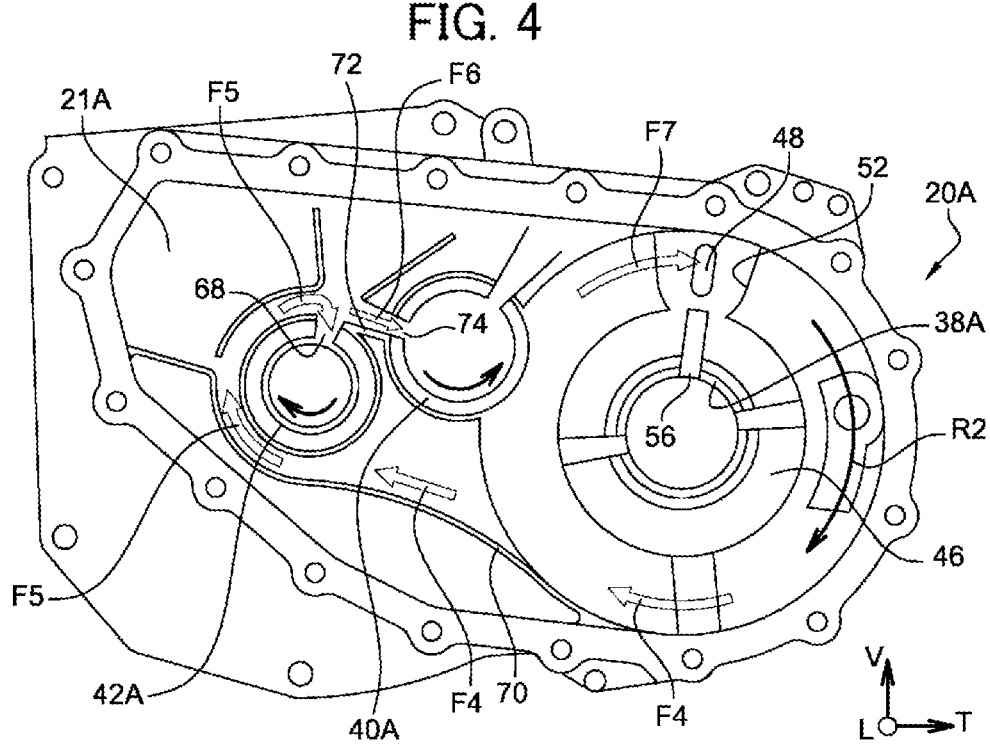
FIG. 4 is a view identical to that of FIG. 3 in which there is indicated the path of the lubricating oil when the ring gear rotates in the second direction of rotation.

FIGS. 3 and 4 depict the internal wall 21A of the first half-case 20A. The wall includes a bell 46 which is intended to accommodate the cage 16 of pinions. On the perimeter of this bell 46 there is situated an upper recess 48 which is intended to receive oil sprayed by the ring gear 14. This recess 48 forms an oil reservoir. The recess 48 is delimited circumferentially by a first longitudinal radial face 50 and by a second longitudinal radial face 52 which are opposite one another. The second radial face 52 is directed transversely toward the primary and secondary shafts 26, 28. The first radial face 50 forms part of the first oil collection means, making it possible to collect the oil when the ring gear 14 rotates in the first direction, whereas the second radial face 52 forms part of the second oil collection means, making it possible to collect the oil when the ring gear 14 rotates in the second direction.

A radial duct 54, termed differential duct 54, arranged on the perimeter of the housing 38A makes it possible to guide the flow of oil downwardly to the housing 38A of the first differential bearing 22. The differential duct 54 opens into an opening 56 in the axial wall of the housing, vertically in line with the differential bearing 22 so as to allow good lubrication of the differential bearing 22. The differential duct 54 is here recessed into the internal wall 21A of the first half-case 20A.

Each housing 40A, 42A of the reducer mechanism 24 is also equipped with ducts forming part of the first oil collection means.

Thus, a duct 58, termed secondary duct 58, is delimited by two ribs 60 projecting with respect to the internal transverse wall 21A. The secondary duct 58 extends over the perimeter of the housing 40A of the first secondary bearing 36. The secondary duct 58 extends globally tangentially with respect to the trajectory of the teeth of the ring gear 14 from an inlet toward an outlet which opens into an opening 62 made in the axial wall of the housing 40A of the first secondary bearing 36. The inlet of the secondary duct 58 is wider than the outlet such that the secondary duct 58 has a funnel shape making it possible to gather a large quantity of oil to lubricate the first secondary bearing 36. On account of its tangential orientation with respect to the ring gear 14, this secondary duct 58 does not make it possible to collect oil when the ring gear 14 rotates in the second direction of rotation.

Likewise, a duct 64, termed primary duct 64, is delimited by two ribs 66 projecting with respect to the internal transverse wall 21A. The primary duct 64 extends over the perimeter of the housing 42A of the first primary bearing 34. The primary duct 64 extends globally from an inlet, which is globally directed toward an upper portion of the ring gear 14, toward an outlet which opens into an opening 68 made in the axial wall of the housing 40A of the first secondary bearing 36. The inlet of the primary duct 64 is wider than the outlet such that the primary duct 64 has a funnel shape making it possible to gather a large quantity of oil to lubricate the first primary bearing 34. On account of its orientation toward the ring gear 14, this primary duct 64 substantially does not make it possible to collect oil when the ring gear 14 rotates in the second direction of rotation.

The first half-case 20A also includes second means for collecting the lubricating oil when the ring gear 14 rotates in the second direction of rotation, as is illustrated in FIG. 4.

The second collection means include a lower ramp 70 for guiding the oil that is formed in the internal transverse wall 21A of the first half-case 20A in order to guide the lubricating oil sprayed from the bottom of the ring gear 14 to the primary pinion 30. The ramp 70 is here formed by a rib projecting with respect to the internal transverse wall 21A. The ramp 70 is directed toward the top of the case 20.

The first end of the ramp 70, shown on the right in FIG. 4, is arranged below the ring gear 14. It has a circular arc shape. This first end is arranged radially opposite to and in the vicinity of the teeth of the ring gear 14. Thus, when the ring gear 14 rotates in the second direction, as indicated by the arrow R2, the ring gear 14 acts as a hydraulic wheel which creates an oil current which ascends the ramp 70 toward its second end.

The second end of the ramp 70, situated on the left in FIG. 4, is arranged below the primary pinion 30. It has a circular arc shape which surrounds a portion of the perimeter of the housing 42A of the first primary bearing 34. This second end is arranged radially opposite to and in the vicinity of the teeth of the primary pinion 30. With the primary pinion 30 rotating in the same direction as the ring gear 14, its teeth transport the oil pushed toward the top of the ramp 70 by the ring gear 14 in the upward direction as far as the opening 68 to lubricate the first primary bearing 34.

The first end of the ramp 70 is lower than the second end. Thus, the ramp 70 has a slope which descends from the second end toward the first end.

To allow the lubricating oil to circulate along the ramp 70 as far as the primary pinion 30, the secondary pinion 32 is arranged at a distance from the oil flow circulating along the lower ramp 70. This prevents the majority of the oil being intercepted by the secondary pinion 32. To this end, the secondary shaft 26 is here offset vertically above the level of the primary shaft 28. As a result, the housing 40A of the secondary bearing is offset vertically in the upward direction with respect to the housing 42A of the primary bearing 34.

A duct 72 is arranged on the perimeter of the housing 40A of the first secondary bearing 36. The duct 72 extends tangentially to the trajectory of the teeth of the primary pinion 30 from an inlet situated at the upper portion of the primary pinion 30 as far as an outlet opening into an opening 74 in the axial wall of the housing 40A of the first secondary bearing 36 in order to supply the first secondary bearing 36 with lubricating oil when the ring gear 14 rotates in the second direction. This duct 72 is delimited by two ribs projecting with respect to the internal transverse wall 21A.

During the rotation of the ring gear 14 in the first direction, indicated by the arrow R1 in FIG. 3, the lubricating oil is taken by the teeth of the ring gear so as to rise toward the top of the case 20, as indicated by the arrow "F1". One portion of the lubricating oil is sprayed against the first radial face 50 of the recess 48. The lubricating oil contained in the recess 48 is then guided as far as the housing 38A of the first differential bearing 22 by the differential duct 54 in order to lubricate it.

Another portion of the lubricating oil is sprayed globally transversely in the direction of the primary and secondary shafts 26, 28 from an upper portion of the ring gear 14. As indicated by the arrow "F2", one portion of this sprayed lubricating oil enters the secondary duct 58 on account of its tangential orientation and is thus guided to the housing 40A of the secondary bearing 36 in order to lubricate it.

As indicated by the arrows "F3", another portion of this sprayed lubricating oil enters the primary duct 64 on account of its tangential orientation and is thus guided to the housing 42A of the primary bearing 34 in order to lubricate it.

The lubricating oil then flows by gravity to the lower ramp 70. The oil flows by gravity along the slope of the lower ramp 70 to the bottom of the ring gear 14 before restarting a lubricating cycle.

During the rotation of the ring gear 14 in the second direction, indicated by the arrow R2 in FIG. 4, the ring gear 14 creates a lubricating oil current, indicated by the arrows "F4", which ascends the slope of the ramp 70 to the primary pinion 30.

The latter then lifts the lubricating oil as far as the opening 68, as indicated by the arrows "F5", in order to lubricate the first primary bearing 34 and also as far as the secondary duct 72, as indicated by the arrow "F6", in order to lubricate the first secondary bearing 36. The first differential bearing 22 is for its part lubricated by lubricating oil lifted directly by the ring gear 14 and sprayed against the second radial face 52 delimiting the recess 48, as indicated by the arrow "F7".

Figure 5:
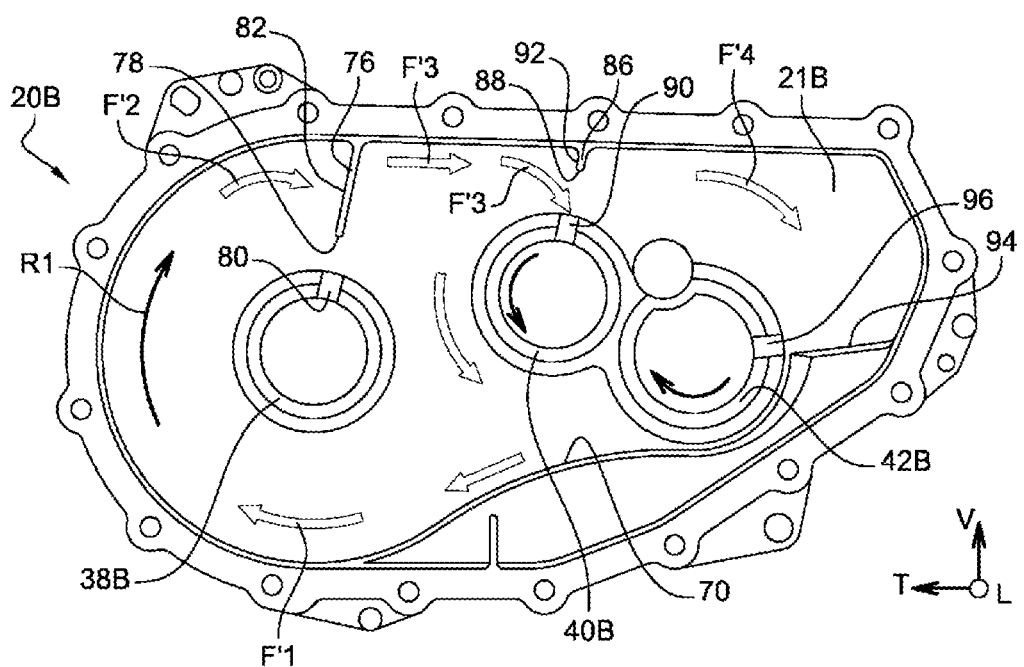
FIG. 5 is a view identical to that of FIG. 2 in which there is indicated the path of the lubricating oil when the ring gear rotates in the first direction of rotation.

FIGS. 2 and 5 depict the internal wall 21B of the second half-case 20B. On this second half-case 20B, the first oil collection means are formed solely by a face of a rib which is oriented globally vertically and which extends above an associated bearing housing. A lower end of the rib is arranged in line with an opening made in the axial face of the associated housing in order to allow the oil collected by the face to drain into the associated housing. The rib is produced integrally with the half-case 20B.

Thus, a first rib 76, termed differential rib 76, extends so as to project with respect to the internal transverse wall 21B. The differential rib 76 is arranged above the housing 38B of the second differential bearing 22. The differential rib 76 extends globally vertically; in the example depicted in FIGS. 2 and 5, it is slightly inclined. The rib 76 extends from an upper end, which is here arranged at an upper internal wall of the half-case 20B, to a free lower end 78. The housing 38B includes a radial opening 80 which is made in its upper part, in line with the free lower end 78 of the differential rib 76. The differential rib 76 is delimited by a first lateral face 82 and by a second lateral face 84. The first lateral face 82 is able to intercept oil sprayed by the ring gear 14 when it rotates in the first direction of rotation R1, as indicated in FIG. 5. The second lateral face 84 is able to intercept oil sprayed by the ring gear 14 when it rotates in the second direction of rotation R2, as indicated in FIG. 2.

Thus, the first lateral face 82 forms part of the first oil collection means, whereas the second lateral face 84 forms part of the second oil collection means.

In a variant of the invention that has not been shown, the first lateral face belonging to the first collection means is borne by a first associated rib, whereas the second lateral face belonging to the second collection means is borne by a second associated rib. The first rib and the second rib are arranged so as to form a "V" whose point is arranged in line with the opening in the housing.

In the same way, a second rib 86, termed secondary rib 86, extends so as to project with respect to the internal transverse wall 21B. The secondary rib 86 is arranged above the housing 40B of the second secondary bearing 36. The secondary rib 86 extends globally vertically; in the example shown in FIGS. 2 and 5, it is slightly inclined. The rib 86 extends from an upper end, which is here arranged at the upper internal wall of the half-case 20B, as far as a free lower end 88. The housing 40B includes a radial opening 90 which is made in its upper part, in line with the free lower end 88 of the secondary rib 86. The secondary rib 86 is delimited by a first lateral face 92 and by a second lateral face 94. The first lateral face 92 is able to intercept oil sprayed by the ring gear 14 when it rotates in the first direction of rotation R1, as indicated in FIG. 5. The second lateral face 84 is able to intercept oil sprayed by the primary pinion 30 when the ring gear 14 rotates in the second direction of rotation R2, as indicated in FIG. 2.

Thus, the first lateral face 92 forms part of the first oil collection means, whereas the second lateral face 94 forms part of the second oil collection means.

The housing 42B of the second primary bearing 34 is here supplied with lubricating oil by a gutter 95 formed from an upwardly directed face and extending in the form of slope from an end situated at an internal lateral wall of the half-case 20B as far as an opening 96 made in an axial face of the housing 42B. This gutter 95 is here common to the first oil collection means and to the second oil collection means, since it makes it possible to collect the lubricating oil and guide it to the second primary bearing 34 whatever the direction R1 or R2 of rotation of the ring gear 14.

As on the first half-case 20A, the second half-case 20B includes a lower ramp 70 for guiding the oil that is formed in the internal transverse wall 21B of the second half-case 20B in order to guide the lubricating oil sprayed from the bottom of the ring gear 14 as far as the primary pinion 30.

The ramp 70 is here formed by a shoulder face. The ramp 70 is directed toward the top of the case 20.

The first end of the ramp 70, shown on the left in FIGS. 2 and 5, is arranged below the ring gear 14. It has a circular arc shape. This first end is arranged radially opposite to and in the vicinity of the teeth of the ring gear 14. Thus, when the ring gear 14 rotates in the second direction, as indicated by the arrow R2, the ring gear 14 acts as a hydraulic wheel which creates an oil current which ascends the ramp 70 toward its second end.

The second end of the ramp 70, situated on the left in FIGS. 2 and 5, is arranged below the primary pinion 30. It has a circular arc shape which surrounds a portion of the perimeter of the housing 42B of the second primary bearing 34. This second end is arranged radially opposite to and in the vicinity of the teeth of the primary pinion 30. With the primary pinion 30 rotating in the same direction as the ring gear 14, its teeth transport the oil pushed toward the top of the ramp 70 by the ring gear 14 in an upward direction as far as the opening 96 in order to lubricate the first primary bearing 34.

The first end of the ramp 70 is lower than the second end. Thus, the ramp 70 has a slope which descends from the second end to the first end.

To allow the lubricating oil to circulate along the ramp 70 as far as the primary pinion 30, the secondary pinion 32 is arranged at a distance from the oil flow circulating along the lower ramp 70. This prevents the majority of the oil being intercepted by the secondary pinion 32. To this end, the secondary shaft 26 is here offset vertically above the level of the primary shaft 28. As a result, the housing 40B of the secondary bearing 36 is offset vertically in the upward direction with respect to the housing 42B of the primary bearing 34.

During the rotation of the ring gear 14 in the first direction, indicated by the arrow R1 in FIG. 5, the lubricating oil is taken by the teeth of the ring gear 14 to rise toward the top of the case 20, as indicated by the arrow "F'1". One portion of the lubricating oil is sprayed against the first lateral face 82 of the differential rib 76, as indicated by the arrow "F'2". The lubricating oil collected by the differential rib 76 flows as far as the free lower end 78, then drains to the housing 38B of the second differential bearing 22 through the opening 80 in order to lubricate it.

Another portion of the lubricating oil is sprayed globally transversely in the direction of the primary and secondary shafts 26, 28 from an upper portion of the ring gear 14. As indicated by the arrows "F'3", this lubricating oil collected by the first lateral face 92 of the secondary rib 86. The lubricating oil collected by the secondary rib 86 flows as far as the free lower end 88, then drains to the housing 40B of the second secondary bearing 36 through the opening 90 in order to lubricate it.

As indicated by the arrow "F'4", lubricating oil is sprayed by the secondary pinion 32 and by the primary pinion 30 toward the internal transverse wall 21B portion situated above the gutter 95. This oil is collected by the gutter 95, which guides it to the opening 96 in the housing 42B of the second primary bearing 34 in order to lubricate it.

The lubricating oil then flows by gravity to the lower ramp 70. The oil flows by gravity along the slope of the lower ramp 70 as far as the bottom of the ring gear 14 before restarting a lubricating cycle.

During the rotation of the ring gear 14 in the second direction, indicated by the arrow R2 in FIG. 2, the ring gear 14 creates a lubricating oil current, indicated by the arrows "F'S", which ascends the slope of the ramp 70 to the primary pinion 30. The latter then lifts the lubricating oil to the opening 96, as indicated by the arrow "F'6", in order to lubricate the first primary bearing 34. One portion of the lubricating oil is sprayed by the primary pinion 30 against the second face 94 of the secondary rib 86. The lubricating oil collected by the secondary rib 86 flows as far as the free lower end 88, then drains to the housing 40B of the second secondary bearing 36 through the opening 90 in order to lubricate it.

The second differential bearing 22 is for its part lubricated by lubricating oil lifted directly by the ring gear 14 and sprayed against the second face 84 of the differential rib 76, as indicated by the arrow "F'7". The lubricating oil collected by the differential rib 76 flows as far as the free lower end 78, then drains to the housing 38B of the second differential bearing 22 through the opening 80 in order to lubricate it.

The case 20 realized according to the teachings of the invention is thus capable of being adapted for vehicles in which the ring gear 14 rotates in one direction or in the other. Thus, it is no longer necessary to design two different cases according to the direction of rotation of the ring gear, thereby making it possible to substantially reduce the production costs of differential reducer.

The invention makes it possible more particularly to realize two circuits for the lubricating oil according to the direction of rotation of the ring gear. Each lubricating circuit is designed to lubricate each bearing of the differential reducer 10.

The invention claimed is:
1. A motor vehicle differential reducer comprising:
a substantially longitudinal differential mechanism comprising at least one ring gear of which a lower portion is intended to be immersed in lubricating oil;
a reduction mechanism comprising a secondary shaft and a primary shaft, a pinion of the primary shaft being driven by the ring gear via a pinion of the secondary shaft;
a case which contains the differential mechanism and the reduction mechanism, the differential mechanism and the primary and secondary shafts each being borne in the case by an associated pair of opposite bearings, the case comprising, on the one hand, a first half-case of which an internal transverse wall comprises three housings which each receive a first bearing of each pair, and, on the other hand, a second half-case of which an internal transverse wall comprises three housings which each receive a second bearing of each pair,
the rotation of the ring gear in a first direction of rotation being capable of spraying oil substantially transversely from the top of the ring gear in the direction of the primary and secondary shafts, each internal transverse wall having first means for collecting and guiding the oil sprayed by the ring gear rotating in the first direction of rotation to the housings;
wherein each internal wall comprises second means for collecting the oil sprayed substantially transversely by rotation of the ring gear in a second direction of rotation from the bottom of the ring gear in the direction of the primary and secondary shafts.
2. The differential reducer as claimed in claim 1, wherein the second means comprise a lower ramp for guiding the oil that is formed in the internal transverse wall of at least one of the first and second half-cases in order to guide the lubricating oil projecting from the bottom of the ring gear to the pinion of the primary shaft.

3. The differential reducer as claimed in claim 2, wherein the pinion of the secondary shaft is arranged at a distance from the oil flow flowing on the lower ramp.

4. The differential reducer as claimed in claim 2, wherein the secondary shaft is offset vertically above the level of the primary shaft.

5. The differential reducer as claimed in claim 2, wherein the lower ramp is produced by a rib which extends longitudinally while projecting from the internal transverse wall.

6. The differential reducer as claimed in claim 2, wherein the housing of the bearing of the primary shaft comprises in its axial face at least one opening for collecting and guiding the oil lifted by the pinion of the primary shaft from the lower ramp when the ring gear rotates in the second direction of rotation.

7. The differential reducer as claimed in claim 2, wherein the perimeter of the housing of the bearing of the secondary shaft comprises at least one duct for collecting and guiding the oil lifted by the pinion of the primary shaft from the lower ramp when the ring gear rotates in the second direction of rotation, the duct guiding the oil to the housing.

8. The differential reducer as claimed in claim 7, wherein at least one of the ducts is formed by at least one rib which extends longitudinally while projecting from the internal transverse wall.

9. The differential reducer as claimed in claim 2, wherein the perimeter of the housing of the bearing of the secondary shaft comprises at least one face for collecting and guiding the oil sprayed by the pinion of the primary shaft when the ring gear rotates in the second direction of rotation, the face guiding the oil to the housing.

10. The differential reducer as claimed in claim 9, wherein at least one of the faces is formed by at least one rib which extends longitudinally while projecting from the internal transverse wall.

11. The differential reducer as claimed in claim 2, wherein the perimeter of the housing of the first bearing of the differential mechanism comprises at least one face for collecting and guiding the oil sprayed by the ring gear when it rotates in the second direction of rotation.

12. The differential reducer as claimed in claim 2, wherein the first means are produced directly in the internal wall of the first and second half-cases.

* * * * *